United States Patent
Mizuno et al.

(10) Patent No.: US 10,957,465 B2
(45) Date of Patent: Mar. 23, 2021

(54) WIRE HARNESS WITH SEWING AND MANUFACTURING METHOD OF WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Housei Mizuno, Mie (JP); Hiroki Hirai, Mie (JP); Makoto Higashikozono, Mie (JP); Hidetoshi Ishida, Mie (JP); Masakuni Kasugai, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/344,620

(22) PCT Filed: Oct. 23, 2017

(86) PCT No.: PCT/JP2017/038177
§ 371 (c)(1),
(2) Date: Apr. 24, 2019

(87) PCT Pub. No.: WO2018/088183
PCT Pub. Date: May 17, 2018

(65) Prior Publication Data
US 2020/0043631 A1    Feb. 6, 2020

(30) Foreign Application Priority Data

Nov. 11, 2016 (JP) .............................. JP2016-220186

(51) Int. Cl.
*H01B 7/00* (2006.01)
*D05B 23/00* (2006.01)
(Continued)

(52) U.S. Cl.
CPC .......... *H01B 7/0045* (2013.01); *D05B 23/006* (2013.01); *H01B 7/18* (2013.01);
(Continued)

(58) Field of Classification Search
None
See application file for complete search history.

(56) References Cited

U.S. PATENT DOCUMENTS 476,454 A * 6/1892 Fefel ...................... D05B 73/12
                                                112/436
726,311 A * 4/1903 Klemm ................. D05B 73/12
                                                112/436
(Continued)

FOREIGN PATENT DOCUMENTS

JP    2001-055660    2/2001
JP    2011-228371    11/2011
(Continued)

OTHER PUBLICATIONS

JPlatPat. Desc_translation_JP2013229809_JPpub2015_090783. 2015. (Year: 2015).*
(Continued)

*Primary Examiner* — Binh B Tran
*Assistant Examiner* — Muhamme Azam
(74) *Attorney, Agent, or Firm* — Greenblum & Bernstein, P.L.C.

(57) ABSTRACT

The wire harness includes a sheathing member that is formed in a sheet shape, at least one electric wire that is arranged on a first principal surface side of the sheathing member, and a sewing thread that sews the electric wire to (Continued)

the sheathing member. A partial region of the sheathing member that is arranged along an extension direction of the electric wire is in a flat state, while another at least partial region of the sheathing member that is arranged along the extension direction of the electric wire is curved in a direction intersecting with the extension direction of the electric wire.

6 Claims, 5 Drawing Sheets

(51) Int. Cl.
  *H01B 7/18* (2006.01)
  *H01B 13/012* (2006.01)
  *H02G 3/30* (2006.01)
  *B60R 16/02* (2006.01)

(52) U.S. Cl.
  CPC ......... *H01B 13/01263* (2013.01); *H02G 3/30* (2013.01); *B60R 16/0215* (2013.01); *D05D 2209/12* (2013.01)

(56) References Cited

U.S. PATENT DOCUMENTS

| | | | | |
|---|---|---|---|---|
| 1,066,759 A * | 7/1913 | Schloss | D04C 1/00 | 87/2 |
| 1,358,521 A * | 11/1920 | Clark | H01B 17/22 | 24/115 R |
| 1,644,304 A * | 10/1927 | Thomas, Jr. | H02G 3/0683 | 285/195 |
| 1,711,552 A * | 5/1929 | Thomas, Jr. | H02G 3/0683 | 285/195 |
| 2,598,728 A * | 6/1952 | Tallman | H02G 7/056 | 403/213 |
| 2,697,769 A * | 12/1954 | Carpenter | H01B 13/2633 | 219/609 |
| 2,697,772 A * | 12/1954 | Kinghorn | H01B 13/2633 | 219/67 |
| 2,715,922 A * | 8/1955 | Miloche | H01B 13/012 | 140/71 R |
| 2,891,750 A * | 6/1959 | Bergquist | H02G 3/0443 | 248/58 |
| 3,177,542 A * | 4/1965 | James | H02G 7/10 | 24/115 R |
| 3,430,903 A * | 3/1969 | Gunther | H02G 3/32 | 248/68.1 |
| 3,495,025 A * | 2/1970 | Ross | D03D 15/02 | 174/70 R |
| 3,633,096 A * | 1/1972 | Bollman | H01B 13/012 | 324/538 |
| 3,814,383 A * | 6/1974 | Jackson | H02G 7/10 | 254/134.3 CL |
| 3,982,059 A * | 9/1976 | Holland | H02G 15/06 | 174/73.1 |
| 3,984,622 A * | 10/1976 | Ross | H01B 7/0045 | 174/72 A |
| 3,998,173 A * | 12/1976 | Williamson | D05B 81/00 | 343/898 |
| 4,158,104 A * | 6/1979 | Ross | H01B 7/083 | 156/55 |
| 4,282,284 A * | 8/1981 | George | C04B 26/06 | 174/121 SR |
| 4,415,765 A * | 11/1983 | Iwasa | H01B 7/365 | 174/112 |
| 4,425,397 A * | 1/1984 | George | C04B 26/06 | 174/121 SR |
| 4,572,466 A * | 2/1986 | Yamaguchi | F16L 3/233 | 24/16 PB |
| 4,716,554 A * | 12/1987 | Depew | H01B 7/045 | 367/154 |
| 4,901,661 A * | 2/1990 | Sturm | D04D 9/04 | 112/436 |
| 4,981,095 A * | 1/1991 | Sturm | D04D 9/04 | 112/417 |
| 5,226,379 A * | 7/1993 | Everett | D05B 35/062 | 112/139 |
| 5,828,007 A * | 10/1998 | Fujishita | H01B 7/428 | 174/120 R |
| 5,893,539 A * | 4/1999 | Tran | H05K 7/1491 | 248/282.1 |
| 6,289,832 B1 * | 9/2001 | Kitamura | D05B 69/36 | 112/273 |
| 7,435,904 B2 * | 10/2008 | Peterson | H02G 3/00 | 174/135 |
| 8,646,397 B2 * | 2/2014 | Ysbrand | D05B 23/00 | 112/136 |
| 2004/0262025 A1 * | 12/2004 | Brandt | H02G 15/115 | 174/88 R |
| 2005/0098767 A1 * | 5/2005 | Ryals | H02G 1/08 | 254/134.3 FT |
| 2006/0197321 A1 * | 9/2006 | Saito | B60R 13/02 | 280/730.2 |
| 2010/0061094 A1 * | 3/2010 | Ijzerman | G02B 6/0021 | 362/235 |
| 2011/0226751 A1 * | 9/2011 | Lazanja | B60N 2/5685 | 219/217 |
| 2012/0125663 A1 * | 5/2012 | Mabuchi | H02G 3/32 | 174/135 |
| 2012/0152160 A1 * | 6/2012 | Ysbrand | D05B 23/00 | 112/475.08 |
| 2013/0139358 A1 * | 6/2013 | Wilson | F16G 11/04 | 24/136 R |
| 2014/0000961 A1 * | 1/2014 | Uehara | H01B 7/083 | 174/72 A |
| 2014/0339843 A1 * | 11/2014 | Wenzel | D05B 15/00 | 296/1.08 |
| 2015/0235734 A1 * | 8/2015 | Takata | D04H 1/559 | 442/389 |
| 2016/0122928 A1 * | 5/2016 | Wenzel | D05C 7/04 | 112/475.17 |
| 2016/0149382 A1 * | 5/2016 | Zettner | H02G 1/06 | 174/72 R |
| 2016/0218494 A1 * | 7/2016 | Schaible | H02G 1/06 | |
| 2016/0336094 A1 * | 11/2016 | Omura | H01B 7/1855 | |
| 2017/0246833 A1 * | 8/2017 | Crespo Pena | B64C 9/00 | |
| 2020/0062198 A1 * | 2/2020 | Mizushita | H02G 3/30 | |
| 2020/0070749 A1 * | 3/2020 | Mizuno | C09J 7/38 | |

FOREIGN PATENT DOCUMENTS

JP 2015-072798 4/2015
JP 2015090783 A * 5/2015

OTHER PUBLICATIONS

JPlatPat. JP_app2013229809_JP2015090783_webpage. 2015 (Year: 2015).*
Official Communication issued in International Bureau of WIPO Patent Application No. PCT/JP2017/038177, dated Nov. 28, 2017.

* cited by examiner

WIRE HARNESS WITH SEWING AND MANUFACTURING METHOD OF WIRE HARNESS

FIELD OF THE INVENTION

The present invention relates to a technology that attaches a sheathing member to an electric wire in a wire harness of a vehicle.

BACKGROUND OF THE INVENTION

Patent Literature 1 discloses a technology that, when attaching a sheet-shaped sheathing member to an electric wire, positions the sheathing member with respect to the electric wire by wrapping tape around each end portion of the sheathing member and the electric wire extending from the end portions.

RELATED ART

Patent Literature

Patent Literature 1: Japanese Patent Laid-open Publication No. 2015-72798

SUMMARY OF THE INVENTION

Problems to be Solved by the Invention

Depending on a wire harness, the wire harness may be provided with a region that is arranged flat and a region that is arranged flexed. In such a case, when separate sheathing members are attached to the region that is arranged flat and the region that is arranged flexed, a number of components may be increased, for example. Additionally, when attempting to accommodate the region that is arranged flat and the region that is arranged flexed with a single sheathing member that is a molded product, the shape may become complicated, for example.

The present invention provides a technology that enables both a region that is arranged flat and a region that is arranged flexed to be easily accommodated with a single sheathing member.

Means for Solving the Problems

In order to resolve the above-noted issues, a wire harness according to a first aspect includes a sheathing member that is formed in a sheet shape, at least one electric wire that is arranged on a first principal surface side of the sheathing member, and a sewing thread that sews the electric wire to the sheathing member. A partial region of the sheathing member that is arranged along an extension direction of the electric wire is in a flat state, while another at least partial region of the sheathing member that is arranged along the extension direction of the electric wire is curved in a direction intersecting with the extension direction of the electric wire.

A wire harness according to a second aspect is the wire harness according to the first aspect, and a slit reaching to an outer edge from inside of the sheathing member is formed at a boundary on the sheathing member between a region arranged in the flat state and a region that is curved.

A wire harness according to a third aspect is the wire harness according to one of the first and second aspect, and a fixating member is sewed to the sheathing member to fixate the electric wire to an attachment object.

A wire harness according to a fourth aspect is the wire harness according to the third aspect, and the sheathing member is kept in a curved state by the fixating member that is provided to the curved region of the sheathing member.

A wire harness according to a fifth aspect is the wire harness according to any one of the first to fourth aspects, and the curved region of the sheathing member has a portion where the sheathing member is in at least two layers, with the first principal surface as an inner circumferential side.

A manufacturing method of the wire harness according to a sixth aspect is a method of manufacturing the wire harness according to any one of the first to fifth aspects, and includes (a) a process of inserting a needle, in which the sewing thread is inserted into a hole provided at a forefront end as an upper thread, into the sheathing member from a second principal surface side; (b) a process of forming a loop in the upper thread that is inserted toward the first principal surface side; and (c) a process of inserting the electric wire, as a bottom thread, through the loop.

Effect of the Invention

According to the first to sixth aspects, the electric wire is sewed to the sheathing member, and therefore, the sheathing member can be easily curved with respect to the direction intersecting with the extension direction of the electric wire. The portion of the sheathing member that is curved in the direction intersecting with the extension direction of the electric wire has an increased degree of freedom in a flexing direction compared to the flat portion. Accordingly, the present invention enables both the region that is arranged flat and the region that is arranged flexed in a wire harness to be easily accommodated with a single sheathing member.

In particular, according to the second aspect, the curved region can have a smaller curve.

In particular, according to the third aspect, the fixating member can be attached easily.

In particular, according to the fourth aspect, the sheathing member can be easily kept in a curved state.

In particular, according to the fifth aspect, an entire circumference of the electric wire can be covered by the sheathing member.

In particular, according to the sixth aspect, the electric wire can be sewed to the sheathing member. At this time, a sewing machine can be used, and therefore, manufacturing the wire harness can be facilitated.

MODE FOR CARRYING OUT THE INVENTION

Embodiment

Figure 1:
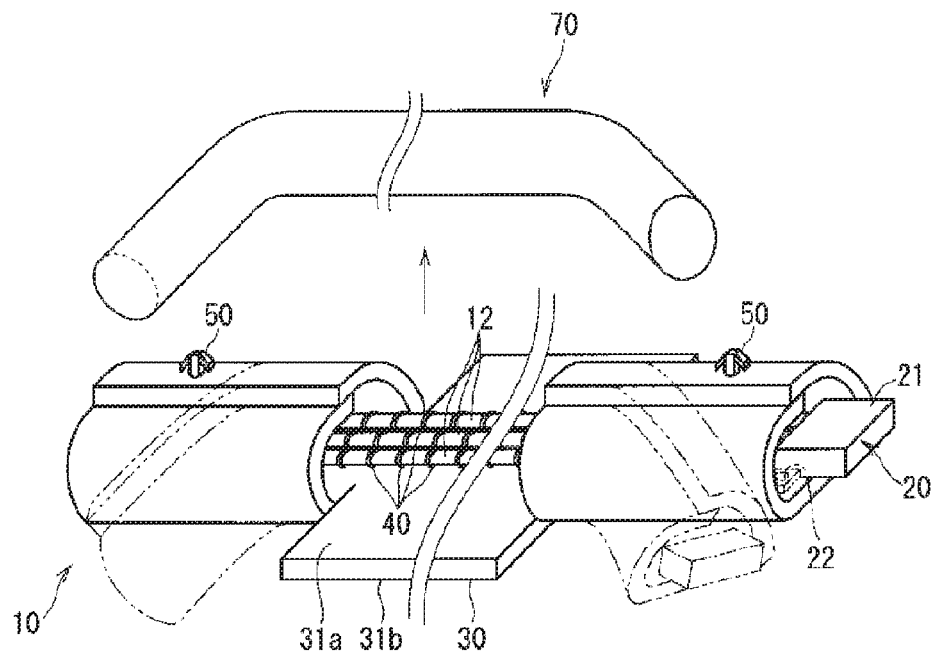
FIG. 1 is a perspective view of a wire harness according to an embodiment.
Figure 2:
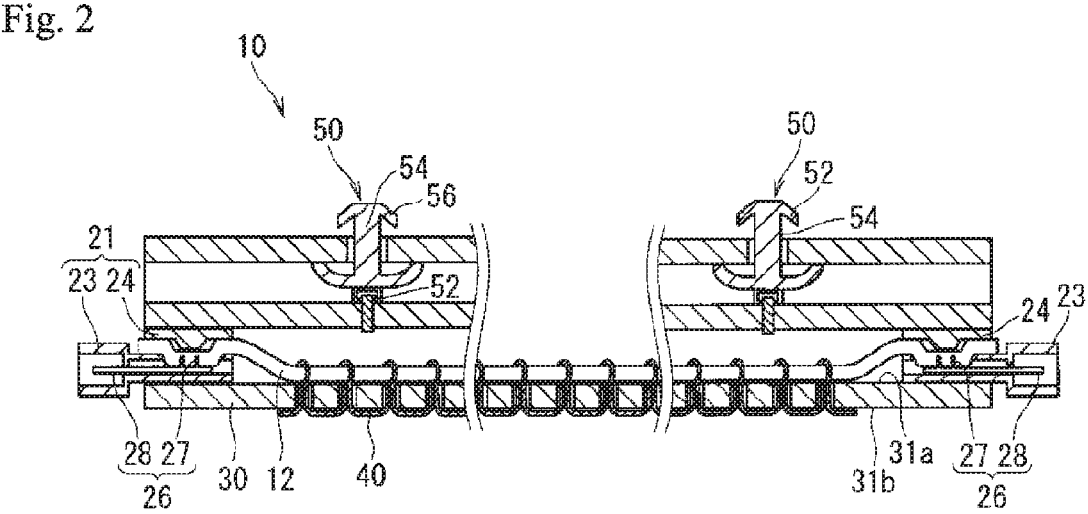
FIG. 2 is a schematic cross-sectional view of the wire harness according to the embodiment.
Figure 3:
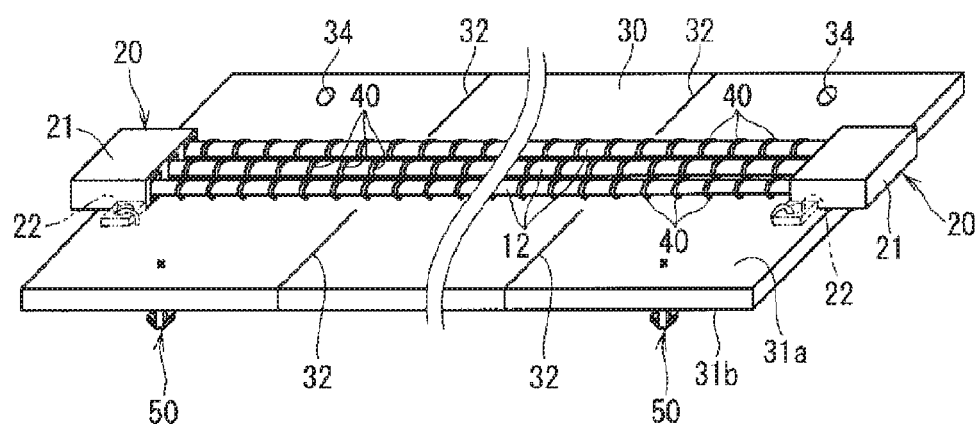
FIG. 3 is a perspective view illustrating a condition before curving a sheathing member.

In the following, a wire harness according to an embodiment is described. FIG. 1 is a perspective view illustrating a wire harness 10 according to the embodiment. FIG. 2 is a schematic cross-sectional view illustrating the wire harness 10 according to the embodiment. FIG. 3 is a perspective view illustrating a condition before curving a sheathing member 30.

The wire harness 10 is used as wiring electrically connecting various electrical devices mounted in a vehicle or the like. In this example, the wire harness 10 is described as a component that is routed around an instrument panel in the vehicle, for example. Naturally, a routing location of the wire harness 10 in the vehicle is not limited to the location noted above, and may be routed around a roof, a door, and the like. Specifically, the wire harness 10 includes the sheathing member 30, an electric wire 12, and a sewing thread 40. The wire harness 10 further includes a connector 20 and a fixating member 50.

In this example, the wire harness 10 is described as being routed along a pole-shaped member 70. In an example illustrated in FIG. 1, the pole-shaped member 70 is a member extending in a three-dimensional direction. In the example illustrated in FIG. 1, the pole-shaped member 70 is formed to have a circular cross-sectional shape. However, this is not strictly necessary, and the pole-shaped member 70 may be formed in an angular shape or the like. A member called a reinforcement, for example, may be imagined as the pole-shaped member 70. When the wire harness 10 is extended along the pole-shaped member 70, the wire harness 10 is also flexed in the three-dimensional direction. In this example, a routing space for the wire harness 10 is narrow around the instrument panel, and there may be some locations that require the sheathing member 30 that is attached to the wire harness 10 to be in a flat shape. On the other hand, when the sheathing member 30 that is attached to the wire harness 10 has a flat shape, the wire harness 10 has difficulty being flexed inside flat surfaces, making it difficult to lay along the pole-shaped member 70 extending in the three-dimensional direction. Given this, the wire harness 10 according to the present invention has a partial region in the sheathing member 30 that is formed in a flat shape and another at least partial region that is formed to flex readily.

The sheathing member 30 is formed in a sheet shape. In the example illustrated in FIG. 1, the sheathing member 30 is formed in a rectangular sheet shape. However, the shape of the sheathing member 30 is not limited to the above-noted shape and may be modified as needed in accordance with a wiring format of the electric wire 12. The sheathing member 30 is a member mounted around the exterior of the electric wire 12. The sheathing member 30 includes at least one function from among functions such as sound proofing (noise canceling, sound absorption, sound insulation, and the like), protection (wear resistance, stretch resistance, penetration resistance, and the like), heat release, shielding, and waterproofing. An appropriate function for the sheathing member 30 is selected according to characteristics of the electric wire 12, an environment of a location where the electric wire 12 is routed, and the like. Here, since the electric wire 12 is arranged in a location where the electric wire 12 may rub against surrounding members, an example is described where the sheathing member 30 is a protection sheet having wear resistance.

The protection sheet is formed by a sheet material such as polyvinyl chloride (PVC), polypropylene (PP), or a nonwoven fabric. When the protection sheet is formed by the nonwoven fabric, hot pressing and the like may be applied. Accordingly, the protection sheet can be hardened. The wear resistance of the protection sheet may be obtained from physical properties of a structure or may be obtained from physical properties of a material. For example, in the example illustrated in FIG. 1, the protection sheet is formed flat, however, the wear resistance of the protection sheet may be enhanced by employing a structure that includes unevenness on an outer surface of the protection sheet. In addition, by employing a structure where the nonwoven fabric is hot-pressed as noted above, the protection sheet can be hardened and the wear resistance can be enhanced, for example. In addition, by employing a hard material for the material configuring the protection sheet, the wear resistance can be enhanced, for example.

As noted above, the sheathing member 30 is flat in a partial region and is curved in another at least partial region. In the example illustrated in FIG. 1, both end sides along an extension direction of the electric wire 12 are curved and the region therebetween is formed to be flat. End portion sides along the extension direction of the electric wire 12 may of course be the flat regions and a curved region may exist between the flat regions. In addition, a first end portion side along the extension direction of the electric wire 12 may be the flat region and a second end portion side may be the curved region. In addition, a greater number of the flat regions and curved regions may be arranged than in the example illustrated in the figures.

In the region where the sheathing member 30 is curved, the sheathing member 30 is in at least two layers, with a first principal surface 31a as an inner circumferential side. Accordingly, the sheathing member 30 can cover the entire circumference of the electric wire 12. Understandably, the sheathing member 30 may also be curved with a second principal surface 31b as the inner circumferential side. In addition the sheathing member 30 may not be in two layers.

In this example, a slit 32 reaching to an outer edge from inside of the sheathing member 30 is formed at a boundary on the sheathing member 30 between the region arranged in the flat state and the curved region. The slit 32 in the example of FIG. 1 is formed along a direction orthogonal to the extension direction of the electric wire 12, however, the slit 32 is not limited to this. In addition, the slit 32, in the example of FIG. 1, is configured as an incision without width, but may also be formed in a recessed shape having width.

The electric wire 12 is arranged on the first principal surface 31a side of the sheathing member 30. At least one electric wire 12 may be included. In this example, a plurality of the electric wires 12 are included (three wires in the example of FIG. 1). In this example, the electric wire 12 is described such that an insulated wire 12 having a core wire 14 and an insulating coating 16 covering the core wire 14 is employed as the electric wire 12 (see FIG. 8). The core wire 14 is formed by a conductive material such as copper or aluminum. The core wire 14 may be a single wire or a twisted wire. The insulating coating 16 may be formed by extrusion molding of a resin or the like onto an outer circumference of the core wire 14, or may be formed by baking varnish or the like that is applied to the other circumference of the core wire 14. However, a bare core wire 14 may be employed as the electric wire 12.

Details are described hereafter, but when a manufacturing process using a sewing machine and the like is employed, the electric wire 12 is preferred to have a high stretch resistance. In addition, it is preferably thin. Also from this point of view, a signal line which is relatively thinner than a power line, which is likely to be relatively thick, is preferred.

An end portion of the electric wire 12 is incorporated in a connector 20. Then, in a state where the wire harness 10 is arranged in an intended placement location of a vehicle or the like, the connector 20 is connected to a connector 20 on a side with various electrical devices which are mounted in the vehicle or the like. Accordingly, the wire harness 10 is used as wiring electrically connecting the various electrical devices mounted in the vehicle or the like.

Here, the connector 20 is also sewed to the sheathing member 30. A hole 22 or a recessed portion or the like is formed in a connector housing 21 of the connector 20, and the connector housing 21 is sewed to the sheathing member 30 by using the hole 22 or the recessed portion or the like. As the hole 22 or the recessed portion, an existing portion such as one formed in a lock portion or one formed in a cassette portion may be used, or a new exclusive portion may be added. However, the connector 20 is not required to be sewed to the sheathing member 30. In this case, the connector 20 may be fixated to the sheathing member 30 by another method such as an adhesive tape or an adhesive agent, or may not be fixated.

Here, as shown in FIG. 2, a connector 20 of a crimping type is employed as the connector 20. More specifically, the connector housing 21 is configured with a first member 23 and a second member 24 that can be combined with the first member 23. The first member 23 can hold a crimped terminal 26 in a state where a crimping portion 27 of the crimped terminal 26 that can be crimped to the insulated wire 12 is exposed to an exterior. Further, the first member 23 is accommodated in a state where a mating connector 28 that is connected to a mating conductor of the crimped terminal 26 can be connected to the mating conductor. The second member 24 is arranged facing the portion of the first member 23 holding the crimping portion 27 and can press the insulated wire 12 toward the crimping portion 27. Then, in a state where the insulated wire 12 is positioned, without being stripped, on the crimping portion 27 of the crimped terminal 26 held in the first portion 23, by pressing the insulated wire 12 to the crimping portion 27 with the second member 24, a portion of the crimping portion 27 breaks through the sheath of the insulated wire 12 and makes contact with and is connected to the core wire 14.

In an example in FIG. 3, all three electric wires 12 are sewed to the sheathing member 30 by the sewing thread 40. However, when a plurality of electric wires 12 are included in the wire harness 10, an electric wire 12 that is not sewed may be included.

In addition, in the example in FIG. 1, all three electric wires 12 are connected to the same connector 20. However, when a plurality of electric wires 12 are included in the wire harness 10, an electric wire 12 that is connected to a different connector 20 may be included.

In addition, in the example shown in FIG. 1, the electric wire 12 is arranged in a straight line. However, the electric wire 12 may be arranged flexed. Then, when the plurality of electric wires 12 are included in the wire harness 10, an electric wire 12 that is arranged in a straight line and an electric wire 12 that is arranged flexed may exist together. In this case, the plurality of electric wires 12 may have branches formed on the sheathing member 30.

In addition, in the example shown in FIG. 1, the electric wire 12 is arranged at a position near a width-direction center with respect to the sheathing member 30. However, a path where the electric wire 12 is arranged with respect to the sheathing member 30 is not limited to the example noted above. For example, the electric wire 12 may be arranged at a position close to a width-direction end portion with respect to the sheathing member 30. Furthermore, for example, the electric wire 12 may extend obliquely with respect to the sheathing member 30.

The sewing thread 40 sews the electric wire 12 to the sheathing member 30. As the sewing thread 40, a member formed to flex more readily than the electric wire 12 is preferred. In addition, it is preferable that the sewing thread 40 has a higher stretch resistance than the electric wire 12. The sewing thread 40 may be formed using natural fiber as a material or may be formed by using chemical fiber as a material. In addition, the sewing thread 40 may be a single thread or a twisted thread.

When the sewing thread 40 may make contact with a surrounding member in a state assembled to the vehicle, a sewing thread 40 that is made of nylon, polyester, or the like and that has high wear resistance, like that of fishing line, is preferably employed.

Here, as shown in FIG. 2, a single continuous sewing thread 40 is employed as the sewing thread 40 that sews one electric wire 20, and the electric wire 12 is sewed at a plurality of positions along the extension direction of the electric wire 12 by the single sewing thread 40. At this time, while the single sewing thread 40 extends along the second principal surface 31*b* side of the sheathing member 30, the sewing thread 40 partially comes out toward the first principal surface 31*a* side of the sheathing member 30 and forms a loop 85. Then, by inserting the electric wire 12 into the loop 85, the electric wire 12 is sewed.

However, one electric wire 12 is not necessarily sewed by one continuous sewing thread 40. A sewing thread 40 which partially sews the electric wire 12 at one position and has both ends cut off may exist at plural locations along the extension direction of the electric wire 12.

The fixating member 50 is a member to fixate the electric wire 12 to an attachment object. Here, the fixating member 50 is also sewed to the sheathing member 30. In this example, the fixating member 50 is a member called a clamp or a clip that has a pillar 54 and a wing 56 extending from a forefront of the pillar 54.

A hole 52 or recessed portion or the like is formed in the fixating member 50, and the fixating member 50 is sewed to the sheathing member 30 using the hole 52 or the recessed portion, or the like. As the hole 52 or the recessed portion, an existing portion may be used, or a new exclusive portion may be added.

In the example shown in FIG. 1, the fixating member 50 is attached so as to extend from the second principal surface 31*b* side, which is on the opposite side from the first principal surface 31*a* where the electric wire 12 is arranged. In addition, the fixating member 50 is arranged at a portion where the sheathing member 30 overlaps with itself in two layers in a region being curved. Accordingly, as shown in FIG. 2, when the sheathing member 30 is curved so as to cover the electric wire 12, a curved state can be kept by inserting the fixating member 50 into the portion of the sheathing member 30 that overlaps with the fixating member 50. As shown in FIG. 3, in the region where the sheathing member 30 is curved, a through-hole 34 may be formed at a portion that overlaps with the portion where the fixating member 50 is provided when the sheathing member 30 is curved. Accordingly, the fixating member 50 can be easily inserted through the portion overlapping with the fixating member 50.

However, the fixating member 50 may be attached so as to project from the first principal surface 31a side. In addition, the fixating member 50 may be provided at the flat region.

<Manufacturing Method>

Next, with reference to FIGS. 4 to 7, a method of manufacturing the wire harness 10 according to the embodiment is described. FIGS. 4 to 7 are explanatory diagrams illustrating a manufacturing process of the wire harness 10 according to the embodiment.

First, the sheathing member 30, the electric wire 12, the sewing thread 40, and a needle 80 are prepared. Here, a needle 80 having a hole 82 is used. The hole 82 is provided at a forefront end of the needle 80. The sewing thread 40 is inserted in the hole 82 as an upper thread 84.

Figure 4:
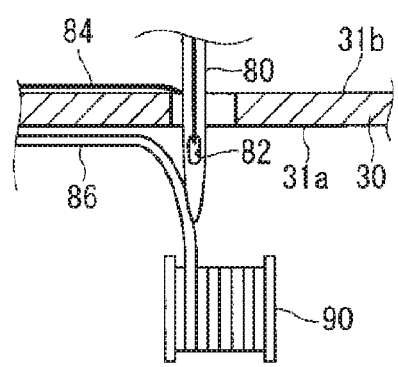
FIG. 4 is an explanatory diagram illustrating a manufacturing process of the wire harness according to the embodiment.

Next, as shown in FIG. 4, the needle 80 having the upper thread 84 passed through the hole 82 is pushed through the sheathing member 30 from the second principal surface 31b side (process (a)). Accordingly, a portion of the upper thread 84 is through to the first principal surface 31a side together with the needle 80.

Figure 5:
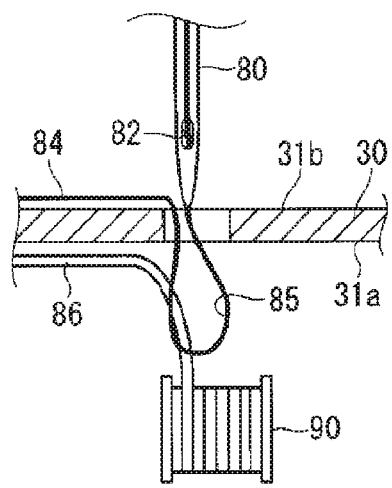
FIG. 5 is an explanatory diagram illustrating a manufacturing process of the wire harness according to the embodiment.

Next, the loop 85 is formed with the upper thread 84 that is passed through the first principal surface 31a side (process (b)). For example, as shown in FIG. 5, when the needle 80 is returned to the second principal surface 31b side, a portion of the upper thread 84 that is through to the first principal surface 31a side together with the needle 80 remains on the first principal surface 31a side and the loop 85 is formed.

Figure 6:
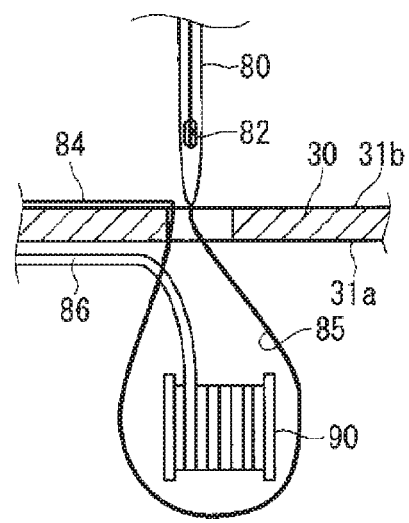
FIG. 6 is an explanatory diagram illustrating a manufacturing process of the wire harness according to the embodiment.

Next, the electric wire 12 is inserted as a bottom thread 86 into the loop 85 (process (c)). Here, the loop 85 is first widened as shown in FIG. 6. Then, the loop 85 is rotated around a bobbin 90 where the electric wire 12 is wound and accommodated, and thereby the bobbin 90 is passed through an inside of the loop 85.

Figure 7:
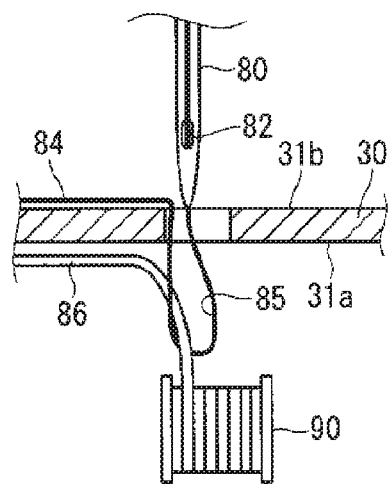
FIG. 7 is an explanatory diagram illustrating a manufacturing process of the wire harness according to the embodiment.

Then, as shown in FIG. 7, by tightening the loop 85, the electric wire 12 is in a state inserted into the loop 85. Accordingly, the sewing of the electric wire 12 to the location is completed.

After that, by repeating the same operation while feeding the sheathing member 30, one electric wire 12 can be sewed continuously with a single thread.

Then, the connector 20 and the fixating member 50 are sewed separately to the sheathing member 30 to which the electric wire 12 is sewed. These may also be sewed before sewing the electric wire 12. After the connector 20 and the electric wire 12 are sewed, the end portion of the electric wire 12 is connected to the crimping connector 20.

Further, the slit 32 and the through-hole 34 are formed in the sheathing member 30. This may be performed prior to the process of sewing or after the sewing. Then, when the sewing process is complete and also the slit 32 and the through-hole 34 are formed, and the state as shown in FIG. 3 has been reached, the curved region of the sheathing member 30 (one side portion on one side of the slit 32) is curved and the fixating member 50 is inserted into the overlapping portion of the sheathing member 30 (here, the through-hole 34) to keep the curved state. Following the above, the wire harness 10 is completed.

The sewing process of the manufacturing method noted above may be used by a sewing machine or may be hand sewn. Using the sewing machine allows a portion of the process to be automated.

When using the sewing machine, the operation of rotating the loop 85 around the bobbin 90 while widening the loop 85 can be performed by a well-known hook member. In addition, by configuring the upper thread 84 to be less strong than the bottom thread 86, the electric wire 12 as the bottom thread 86 can inhibit being pulled toward the second principal surface 31b side of the sheathing member 30 by the upper thread 84.

According to the wire harness 10 configured as above and the manufacturing method thereof, the electric wire 12 is sewed to the sheathing member 30, and therefore, the sheathing member 30 can be easily curved with respect to the direction intersecting with the extension direction of the electric wire 12. Then, the portion of the sheathing member 30 that is curved in the direction intersecting with the extension direction of the electric wire 12 has a high degree of freedom in a flexing direction compared to a flat portion. Accordingly, both the region that is arranged flat and the region that is arranged flexed in the wire harness 10 can be accommodated with a single sheathing member 30. At this time, the sewing machine can be used for the sewing process, and therefore, manufacturing the wire harness 10 is facilitated.

In addition, the slit 32 reaching to the outer edge from inside of the sheathing member 30 is formed at the boundary on the sheathing member 30 between the region arranged in the flat state and the curved region, and therefore, the curved region can be curved more easily and have a smaller curve. In addition, the region in the flat state is inhibited from being curved.

In addition, the fixating member 50 that fixates the electric wire 12 to the attachment object is sewed to the sheathing member 30 and therefore the fixating member 50 can be easily attached.

In addition, the sheathing member 30 is kept in a curved state by the fixating member 50 that is provided in the curved region of the sheathing member 30, and therefore, the sheathing member 30 can be easily kept in a curved state.

Further, in the curved region of the sheathing member 30, the sheathing member 30 is in at least two layers with the first principal surface 31a as the inner circumferential side, and therefore, an entire circumference of the electric wire 12 can be covered by the sheathing member 30.

{Modifications}

Figure 8:
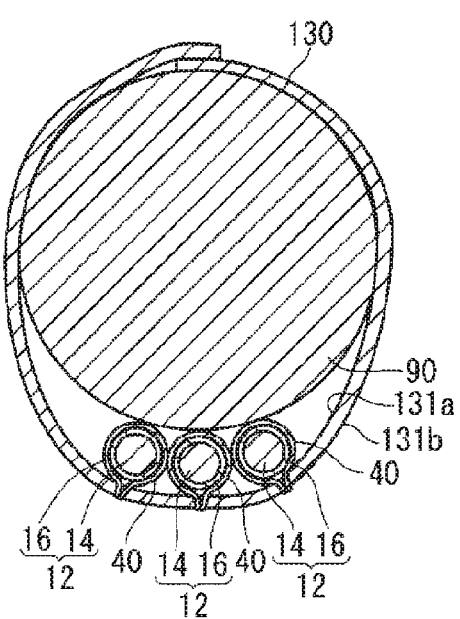
FIG. 8 is a schematic cross-sectional view of a modification of the wire harness.

FIG. 8 is a schematic cross-sectional view of a modification of the wire harness 10.

A wire harness 110 according to the modification is different from the wire harness 10 according to the embodiment in that a portion of a sheathing member 130 in a width direction is wrapped around the pole-shaped member 70.

In the example of FIG. 8, a first principal surface 131a of the sheathing member 130 where the electric wire 12 is arranged faces toward the pole-shaped member 70, however, this is not strictly required and a second principal surface 131b side may face the pole-shaped member 70.

Figure 9:
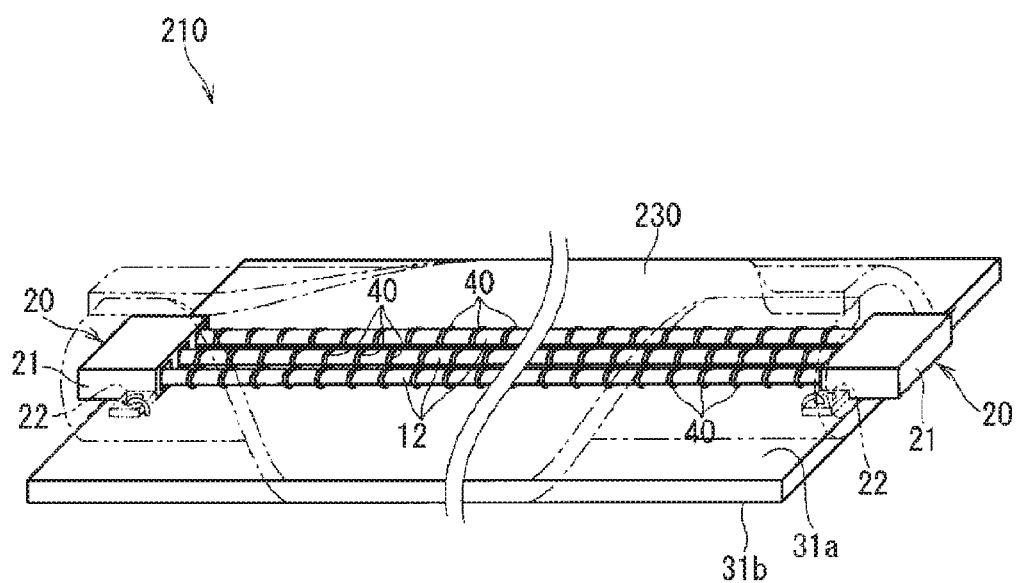
FIG. 9 is a schematic perspective view of another modification of the wire harness.

FIG. 9 illustrates a schematic perspective view of another modification of the wire harness 10.

A wire harness 210 according to the modification is different from the wire harness 10 according to the embodiment because the slit 32 is not provided to a sheathing member 230.

In this way, even when the slit 32 is not provided to the sheathing member 230, while curving a partial region of the sheathing member 230, another partial region can be kept flat.

{Additional Modifications}

In the embodiment, the wire harness 10 is described as being routed along the pole-shaped member 70, however, this is not strictly required. For example, the wire harness 10 can also be routed along a flat plate member such as a vehicle panel or a roof.

In addition, the protection sheet is described as having wear resistance, however, this is not strictly required. The protection sheet can also have penetration-resistance. In this case, the protection sheet may include the penetration-resistance required by a use environment of the vehicle, and the needle 80 that is used when sewing the electric wire 12 to the protection sheet may be inserted into the protection sheet with a penetrating force greater than that. In addition, in the embodiment, the sheathing member 30 is described as being the protection sheet, however, this is not strictly required. The sheathing member 30 may be a noise-canceling member, a shielding member, and a heat-releasing member, or may serve as a tension member.

In addition, the electric wire 12 is described as being sewed by one sewing thread 40 each, however, this is not strictly required. A plurality of electric wires 12 may be grouped and sewed by the sewing thread 40. In this case, the plurality of electric wires 12 may be grouped by an adhesive tape or the like. In addition, a cable that is provided with a plurality of electric wires 12 and a sheath covering a circumference of the plurality of electric wires 12 may be employed.

In addition, the connector 20 has to this point been described as using the crimping connector 20, however, this is not strictly required. For example, a crimped terminal that is crimped to the end portion of the electric wire 12 may be accommodated.

The configurations described in each of the above embodiments and each of the modifications can be combined as appropriate so long as they do not contradict each other. For example, the sheathing member 30 may be configured by combining a plurality of sheet materials that each have separate functions.

The detailed description above of the present invention is presented merely as an example in all aspects and dose not limit the present invention. Numerous modifications not given as examples are understood to be conceivable without departing from the scope of the present invention.

DESCRIPTION OF REFERENCE NUMERALS

10: Wire harness
12: Electric wire
14: Core wire
16: Insulating coating
20: Connector
21: Connector housing
22: Hole
23: First member
24: Second member
26: Crimped terminal
27: Crimping portion
28: Mating connector
30: Sheathing member
31a: First principal surface
31b: Second principal surface
32: Slit
40: Sewing thread
50: Fixating member
52: Hole
54: Pillar
56: Wing
70: Pole-shaped member
80: Needle
82: Hole
84: Upper thread
85: Loop
86: Bottom thread
90: Bobbin

What is claimed is:

1. A wire harness comprising:
a sheath member that is formed in a sheet shape,
at least one electric wire that is arranged on a first principal surface side of the sheath member, and
a sewing thread that sews the at least one electric wire to the sheath member,
wherein a partial region of the sheath member that is arranged along an extension direction of the at least one electric wire is in a flat condition, while another partial region of the sheath member that is arranged along the extension direction of the at least one electric wire is curved in a direction intersecting with the extension direction of the at least one electric wire to curve out of a plane in which the partial region is disposed, and the partial region and the another partial region extend along different portions of the at least one electric wire along the extension direction of the at least one electric wire.

2. The wire harness according to claim 1, wherein a slit reaching to an outer edge from inside of the sheath member is formed at a boundary on the sheath member between the partial region that is arranged in the flat condition and the another partial region that is curved.

3. The wire harness according to claim 1, wherein a fixating fastener is sewed to the sheath member to fixate the at least one electric wire to an attachment object.

4. The wire harness according to claim 3, wherein the sheath member is kept in a curved condition by the fixating fastener that is provided to the curved another partial region of the sheath member.

5. The wire harness according to claim 1, wherein the curved another partial region of the sheath member has a portion where the sheath member is in at least two layers, with the first principal surface side as an inner circumferential side.

6. A manufacturing method of the wire harness according to claim 1, the manufacturing method comprising:
inserting a needle, in which the sewing thread is inserted into a hole provided at a forefront end as an upper thread, into the sheath member from a second principal surface side;
forming a loop in the upper thread that is inserted toward the first principal surface side; and
inserting the at least one electric wire, as a bottom thread, through the loop.

* * * * *